A. PIETROBONO.
HAND MOWER.
APPLICATION FILED JAN. 22, 1917.
1,228,045.
Patented May 29, 1917.
2 SHEETS—SHEET 1.
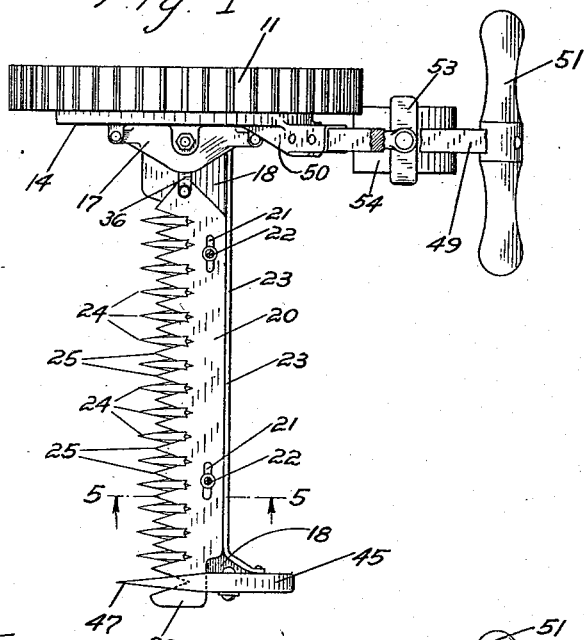
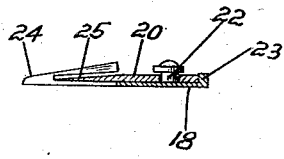
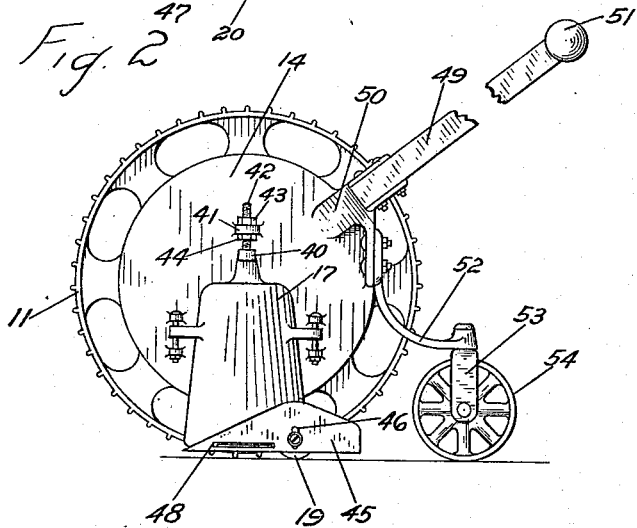
WITNESS
INVENTOR
Angelo Pietrobono
BY
Wooster & Bowersock
ATTORNEYS A. PIETROBONO.
HAND MOWER.
APPLICATION FILED JAN. 22, 1917.
1,228,045.
Patented May 29, 1917.
2 SHEETS—SHEET 2.
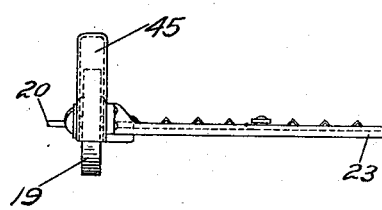
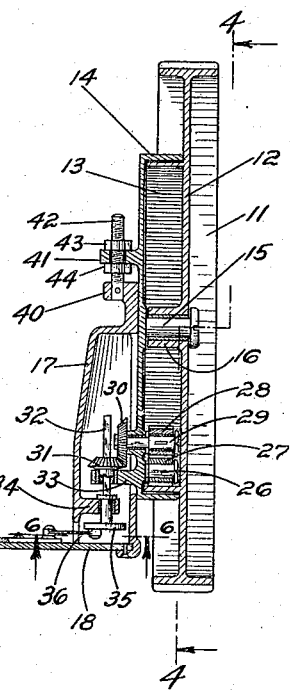
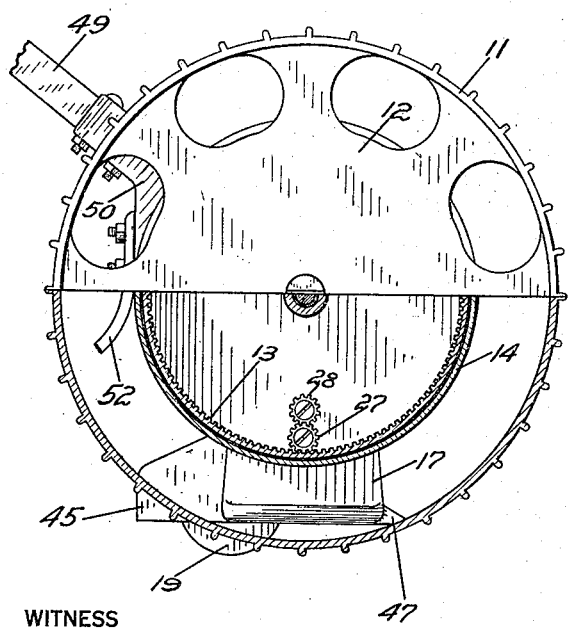
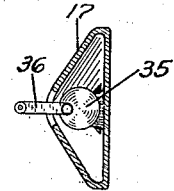
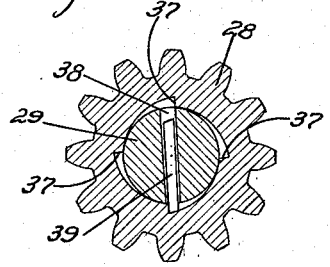
WITNESS
Chester F. Hayden.
INVENTOR
Angelo Pietrobono
BY
Wooster V. Bowersock
ATTORNEYS

UNITED STATES PATENT OFFICE.

ANGELO PIETROBONO, OF RIVERSIDE, CONNECTICUT.

HAND-MOWER.

1,228,045.  Specification of Letters Patent.  Patented May 29, 1917.

Application filed January 22, 1917. Serial No. 143,624.

*To all whom it may concern:*

Be it known that I, ANGELO PIETROBONO, a subject of the King of Italy, residing at Riverside, county of Fairfield, State of Connecticut, have invented an Improvement in Hand-Mowers, of which the following is a specification.

This invention relates generally to mowers or reapers, with more particular reference to a mowing machine of relatively small size and adapted to be manually operated for the cutting of grass and other forage, or even grain, under conditions which render impracticable the use of horse-drawn machines. For example, a field or a portion thereof may be wooded to a certain extent, or may abound with rock deposits or boulders, or the surface thereof may be excessively uneven, and any of such conditions render impracticable, if not impossible, the use of a horse drawn mower or reaper.

The present invention contemplates the provision of a manually operated mowing or reaping machine which, as it is primarily intended to be an auxiliary machine and used in addition to the larger and more expensive horse-drawn machines, is comparatively simple in construction and therefore relatively cheap in cost, and this without sacrifice of efficiency and dependability in the performance of such functions as those to which I have referred.

My invention will be more readily understood by reference to the accompanying drawings, forming a part of this specification, in which—

Figure 1 is a top plan view of a machine embodying my invention;

Fig. 2 is a side elevation thereof;

Fig. 3 is a slightly enlarged transverse vertical central section thereof, partly in elevation;

Fig. 4 is a vertical section taken substantially on the broken line 4—4 of Fig. 3;

Fig. 5 is an enlarged sectional detail view taken substantially on the line 5—5 of Fig. 1;

Fig. 6 is a sectional detail view taken substantially on the line 6—6 of Fig. 3, and Fig. 7 is an enlarged sectional detail view of a one-way clutch, as hereinafter more fully described.

Referring now to the drawings in detail, numeral 11 denotes a relatively large wheel of the traction type, the web 12 of which has preferably cast or otherwise formed integral therewith the internal gear 13 of relatively small diameter. The gear 13 is incased in a suitable housing 14 which carries the axle 15 upon which is mounted the hub 16 of the wheel 11. Mounted upon the housing 14, in a manner to be hereinafter described, is a supplemental housing 17, at the lower end of which is secured the toothed plate 18 the other end of which is carried by the small wheel 19, whereby when the wheel 11 is driven the plate 18 will be properly supported in transit in a substantially horizontal position.

Mounted upon the plate 18 is the toothed plate 20, which I have shown provided with slots 21 21 through which pass pins or studs 22 mounted on the plate 18, whereby the plate 20 may be longitudinally reciprocated on the plate 18. I have also shown the plate 18 provided with a flange 23 at its rear edge to provide an additional support for the plate 20 against the forces resisting forward movement thereof.

The teeth 24 of the plate 18 may be said to be substantially V-shaped, providing relatively deep slots at the rear ends thereof which permit of the reciprocation therethrough of the teeth 25 of the plate 20. As this is a common and well-known expedient for insuring clean cutting through the instrumentality of oppositely reciprocating blades, further description is believed to be unnecessary.

Mounted on the inner wall of the housing 14 is an axle or stud 26 upon which is journaled the idler pinion 27 in mesh with the internal gear 13 and with the pinion 28 on the short shaft 29 which projects through suitable bearings in the housing 14 and into the supplemental housing 17. On the end of the shaft 29, within the housing 17, is mounted a beveled gear 30 in mesh with a corresponding gear 31 on a shaft 32, which has bearings in a bracket 33 projecting outwardly from the housing 14 and in the bracket 34 projecting inwardly from the wall of the housing 17. At the lower end of the shaft 32 is mounted the wheel-crank 35 pivoted to which is the connecting-rod 36 the other end of which is pivoted to the plate 20. It will be seen, therefore, that upon rotation of the wheel 11, the internal gear 13 will operate through the pinions 27 and 28, the gears 30 and 31, the wheel-crank 35 and the connecting-rod 36 to reciprocate the plate 20 on the plate 18 and cause relative shearing movement between the teeth 24 and 25.

Of course, there is no reason for reciprocation of the plate 20 when for any reason the machine is being moved or drawn rearwardly. In fact, this would be objectionable, and I have therefore shown the pinion 28 connected to the shaft 29 by means of a one-way clutch, shown in detail in Fig. 7. The bore of the pinion 28 is provided with a plurality (preferably four) shoulders 37 and the shaft 29 is provided with a diametrical slot 38 passing therethrough in which is loosely placed the plate 39. It will be apparent that if the pinion 28 is rotated in a counter-clockwise direction (Fig. 7) no engagement will be effected between the plate 39 and said pinion, and the shaft 29 will not be rotated. However, if the pinion 28 is rotated in a clockwise direction, the plate 39 will drop by gravity back of one of the stops or shoulders 37, thus engaging the shaft and being frictionally held in engaging position under the forces of traction.

It is of course desirable that the vertical position of the plate 18 be made adjustable, in order to vary the height at which the same is supported above the ground. To effect this adjustment, I secure the housing 17, which carries one end of said plate, to the housing 14 by means of brackets 40 and 41 on said housings, respectively, the bracket 40 being provided with a screw 42 which passes through an aperture in the bracket 41 wherein it is secured by means of the adjusting nut 43 and the lock nut 44. Therefore, the housing 17 with the end of the plate 18 carried thereby may be positionally adjusted on the housing 14. I have shown the other end of the plate 18 secured to a housing 45 which incases the wheel 19, this housing being provided with a slot 46 (Fig. 2) and its opposite counterpart through which the axle of the wheel projects and wherein it is secured, whereby said housing and the end of the plate 18 supported thereby may be raised and lowered with reference to said wheel and secured at the desired elevation. The forward end of this housing provides the tooth 47, and it is further provided with a slot 48 through which projects the end of the toothed plate 20, whereby the grass or grain in front of the wheel 19 is cut to clear a passage therefor so that forward movement thereof will not be impeded.

The machine is designed to be driven by means of an arm 49 secured in a bracket 50 projecting from the housing 14, said arm being provided at its end with a usual type of handle 51 conveniently located to be grasped by the operator to either push or pull the machine. To support the machine in stable equilibrium when at rest, I secure to the housing 14 an arm 52 carrying at its end the yoke 53 in which is journaled the axle of the small idler wheel 54.

The operation of my machine is thought to have been clearly brought out in the foregoing description. It will be apparent, first, that the machine is stably supported when in a condition of rest; second, that it may be easily driven over the surface of the ground, either forwardly or rearwardly, by manual forces applied in a proper direction to the handle 51; third, that there is no movement of the reciprocating blade 20 during rearward movement of the machine, but said blade is reciprocated upon forward movement thereof, and the teeth thereon coöperate with the teeth on the stationary supporting bar 18 to shear grass or other forage; fourth, that the cutting blades are vertically adjustable and may be supported at the desired height—within certain limits—above the ground; fifth, that the driving pinions and gears, as well as the bearings and other parts most subject to wear, are incased within a suitable housing and therefore protected against the action of dust and dirt; and, sixth, that considering its purposes the machine of my invention is light in weight and therefore easily handled, and is exceedingly simple in construction and dependable in operation.

Having thus described a practical and convenient embodiment of my invention, I claim as new and desire to secure by Letters Patent:

1. A machine of the character described comprising a driving wheel, said wheel carrying an internal gear and a housing, a pair of superposed plates adjustably supported in a substantially horizontal position at one end by said housing and at the other end by a wheel paralleling said driving wheel, said plates being provided with cutting teeth which coöperate to perform shearing operations upon relative longitudinal reciprocation of said plates, and connecting means within said housing and between said internal gear and said plates to effect such relative reciprocation when said driving wheel is rotated in a direction to advance the machine.

2. A machine of the character described comprising a driving wheel, said wheel carrying an internal gear and a housing, a fixed plate provided with cutting teeth, said plate being laterally disposed with reference to said wheel and supported at one end by said housing and at the other end by a wheel paralleling said driving wheel, a toothed plate longitudinally reciprocable on said fixed plate whereby the teeth of both plates coöperate to perform shearing operations, and connecting means within said housing and between said internal gear and the relatively movable plate to reciprocate the latter on said fixed plate upon rotation of said driving wheel in a direction to advance the machine.

3. A machine of the character described comprising a driving wheel, said wheel carrying an internal gear and a housing, a fixed plate provided with cutting teeth, said plate being laterally disposed with reference to said wheel and supported at one end by said housing and at the other end by a wheel paralleling said driving wheel, a toothed plate longitudinally reciprocable on said fixed plate whereby the teeth of both plates coöperate to perform shearing operations, and a gear train within said housing actuated from said internal gear and actuating a crank and connecting rod for reciprocating the relatively movable plate upon rotation of said driving wheel in a direction to advance the machine.

4. A machine of the character described comprising a driving wheel, said wheel carrying an internal gear and a housing, a fixed plate provided with cutting teeth, said plate being laterally disposed with reference to said wheel and being adjustably supported at one end by said housing and at the other end by a wheel paralleling said driving wheel, a toothed plate longitudinally reciprocable on said fixed plate whereby the teeth of both plates coöperate to perform shearing operations, and connecting means within said housing and between said internal gear and the relatively movable plate to reciprocate the latter on said fixed plate upon rotation of said driving wheel in a direction to advance the machine, said connecting means comprising a horizontal shaft driven by pinions from said internal gear, a vertical shaft driven by bevel-gears from said horizontal shaft, all located within said housing, a crank on said vertical shaft and a connecting rod between said crank and the reciprocable plate.

In testimony whereof I affix my signature.

ANGELO PIETROBONO.

Copies of this patent may be obtained for five cents each, by addressing the "Commissioner of Patents, Washington, D. C."